United States Patent [19]
Nunez et al.

[11] Patent Number: 5,196,458
[45] Date of Patent: Mar. 23, 1993

[54] SOFT, HIGH OXYGEN PERMEABILITY OPHTHALMIC LENS

[75] Inventors: Ivan M. Nunez, Jacksonville; James D. Ford; Frank Molock, both of Orange Park, all of Fla.

[73] Assignee: Johnson & Johnson Vision Products, Inc., Jacksonville, Fla.

[21] Appl. No.: 777,767

[22] Filed: Oct. 15, 1991

[51] Int. Cl.⁵ .................................................. C08F 24/00
[52] U.S. Cl. .................................. 523/106; 351/160 H; 526/238.23; 536/18.3
[58] Field of Search ............. 351/160 H; 526/238.23; 523/106; 536/18.3

[56] References Cited

U.S. PATENT DOCUMENTS

| | | | |
|---|---|---|---|
| 3,225,012 | 12/1965 | Black et al. | 260/78 |
| 3,356,652 | 12/1967 | Ray-Chaudhuri | 261/78.4 |
| 4,451,629 | 5/1984 | Tanaka et al. | 523/106 |
| 4,465,827 | 8/1984 | Kawasaki et al. | 536/18.5 |
| 4,820,810 | 4/1989 | Klein et al. | 521/115 |

FOREIGN PATENT DOCUMENTS

| | | |
|---|---|---|
| 0263061 | 4/1988 | European Pat. Off. |
| 0330614 | 8/1989 | European Pat. Off. |
| 0330615 | 8/1989 | European Pat. Off. |
| 0330618 | 8/1989 | European Pat. Off. |
| 0862567 | 1/1983 | U.S.S.R. ............ 526/238.23 |

Primary Examiner—Paul R. Michl
Assistant Examiner—Andrew E. C. Merriam
Attorney, Agent, or Firm—Joel R. Petrow

[57] ABSTRACT

A low water contact lens material having high $O_2$ permeability, a lower water content and reduced polymer matrix size provides adequate $O_2$ to the cornea, but does not wick water away from the eye nor allow protein or other tear components to penetrate and deposit in the lens. Such a lens is made by polymerizing and crosslinking a prepolymer which contains a cyclic polyol with polyalkylether segments containing curable segments. The cyclic polyols consist of alkoxylated glucose or sucrose which are then reacted with an isocyanate to produce an ultraviolet curable prepolymer. The prepolymer is then placed in a mold and polymerized by exposure to ultraviolet light. The free hydroxyl groups of the material react with a highly hydrophilic reagent to form covalent bonds thus making the surface of the material more wettable.

11 Claims, 3 Drawing Sheets

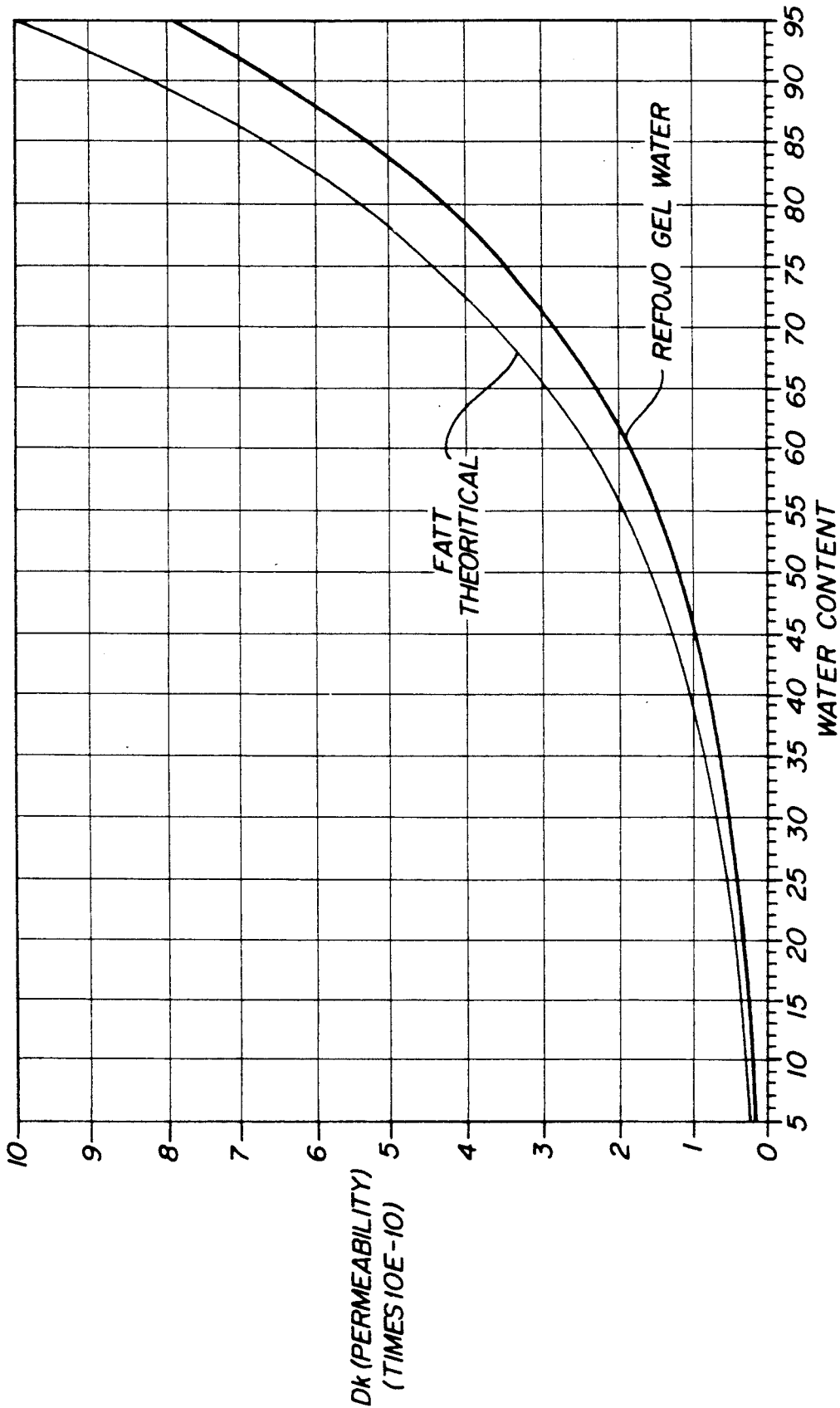

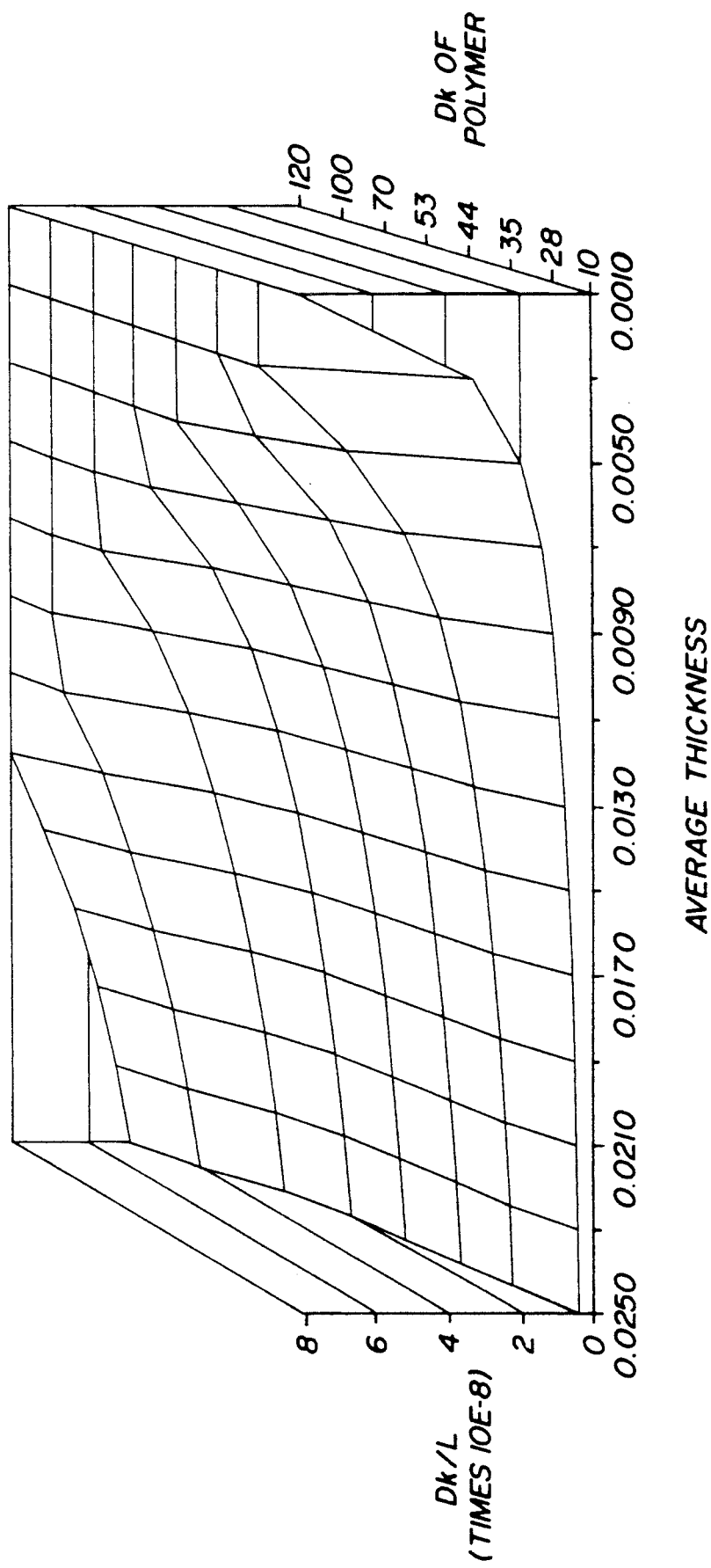

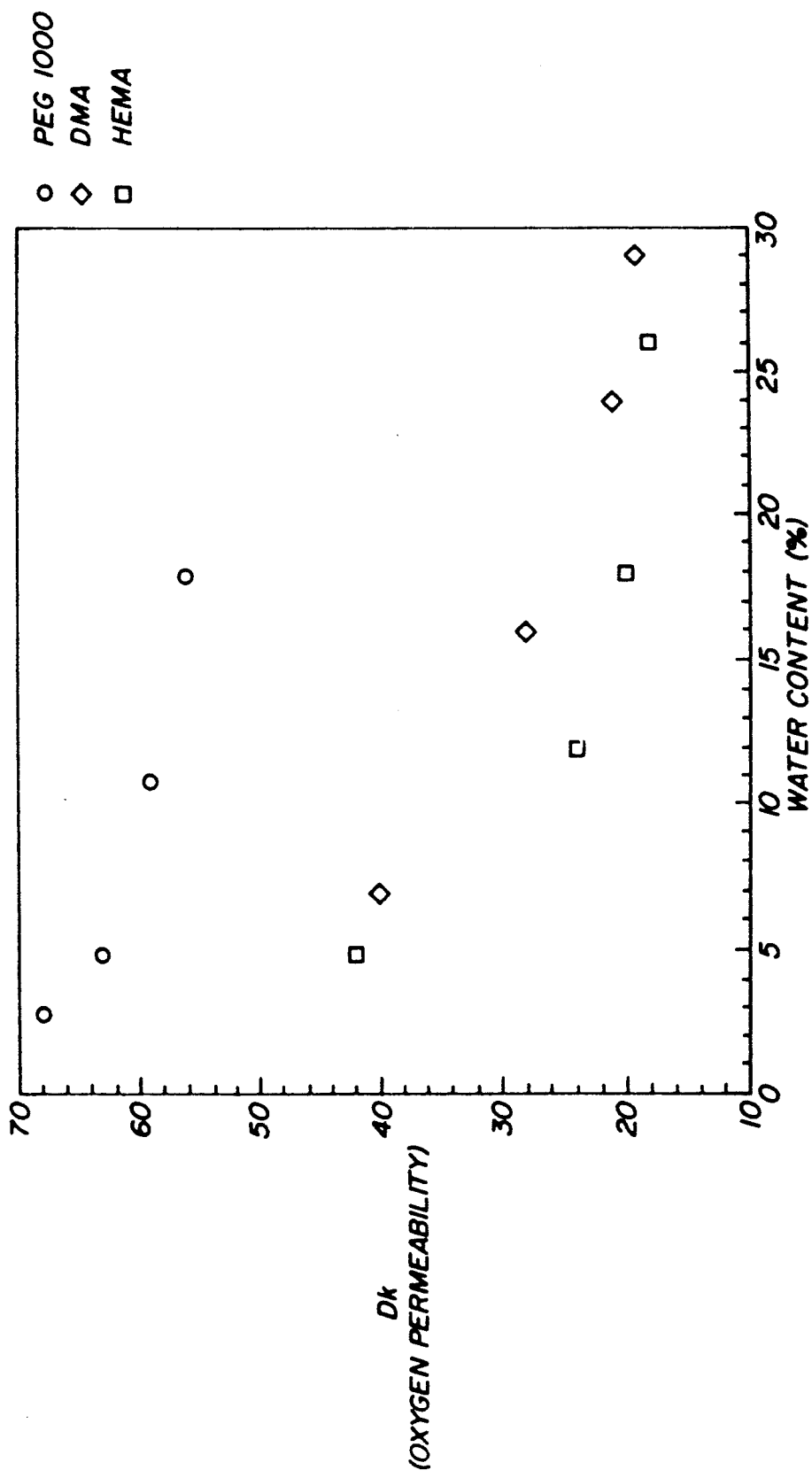

SOFT, HIGH OXYGEN PERMEABILITY OPHTHALMIC LENS

BACKGROUND OF THE INVENTION

Any ophthalmic lens must meet a variety of criteria in order to be acceptable for wear. Foremost for a contact lens, any material placed over the cornea of the eye must in some way provide for the passage of oxygen to the eye and waste products away from the eye. With hydrated soft contact lenses this is accomplished by having a material that, inherent with its high water content (sometimes over 50%), passes oxygen to the eye via the water contained in the lens.

Hydrated soft contact lenses, however, can act as a wick, drawing water way from the tear fluid in the eye and hastening its evaporation. This results in the "dry eye" effect, wherein an excess of moisture is drawn away from the eye by the hydrophilic lens.

In contrast, the hard contact lens does not exhibit this wicking effect because water does not absorb and pass through the lens, but rather is underneath the lens. Hard lenses, however, can have a deleterious effect on the eye because of its non-pliable nature and the movement of the lens over the cornea whenever the wearer blinks can cause mechanical agitation.

Other desirable and undesirable characteristics are divided between hard and hydrated soft contact lenses.

For example, hard contact lenses do not absorb proteins and lipids to the extent that a high water content hydrogel does. The semi-rigid and hard lenses do adsorb some surface proteins and lipids, but these low water content materials absorb no proteins or lipids into the bulk material. Proteins and possibly lipids are taken into the material of the soft lenses along with the tear fluid where they may be deposited. In general, this necessitates cleaning of the hydrated lens to remove protein and lipid deposits. Furthermore, hard contact lenses typically exhibit a higher strength and higher refractive index because they contain more plastic and less water allowing them to be made thinner.

Soft hydrated contact lenses have enjoyed wide acceptance because of high degree of comfort and an extended period of wear. Most soft hydrophilic contact lens polymers produced over the last decade have strived to increase the water content of the material because of the water's contribution to wearer comfort and the passage of oxygen and carbon dioxide through the lens. This increase in water content, however, leads to the aforementioned problem with wicking of moisture away from the eye and also reduces the refractive index of the lens (i.e., the ability of the lens to bend light), and decreases the stiffness of the lens resulting in poorer handling properties. This in turn requires the lens to be thicker in order to meet the refractive requirements necessary for the optical correction needed by the wearer.

If a lens material is either not permeable enough to oxygen and carbon dioxide, or does not provide the "tear pumping" action required to move the tear layer between the cornea and the lens to transport oxygen and carbon dioxide, negative physiological responses occur, which include: acidosis, decreased metabolic rates, thinning of the cornea, microcysts, and stromal edema.

Other physiological problems can occur even with highly permeable lenses from effects such as protein deposits, lens ageing, occlusions, mechanical abrasion and bacterial contamination such as papillary conjunctivitis, acute inflammation, acute red eye, and 3 and 9 o'clock staining of the central cornea.

The importance of water content for oxygen permeability in a hydrogel contact lens is shown in FIG. 1. Permeability of a gas through a material is expressed as a quantitative value given by Dk, which is equal to the diffusion constant, D, times the solubility, k. At 35° C., Dk for a typical hydrogel lens is quantitatively expressed as $[2.0 \times 10^{-11}]e^{[.0442(\text{"}\%H2O\text{"})]}$ $(cm \times mm/s)(ml\ O_2/ml \times mm\ Hg)$.

Despite the increased water content of hydrogel contact lenses, current hydrogel lens may not supply the cornea with enough oxygen and corneal edema during wear may not be as low as desired.

It is believed that extended wear contact lenses would at a minimum need to have a Dk/L (where L being the thickness of the lens) between $75 \times 10^{-9}$ and $90 \times 10^{-9}$ $(cm \times ml\ O_2)/(s \times ml \times mm\ Hg)$ to reduce corneal edema to an acceptable level.

Current high water content lenses, for example, those that are approximately 70% water, need to be made at approximately 140 to 250 microns thickness to achieve the necessary optical and other physical properties. With this water content and at this thickness, it is seen in FIG. 2 that the Dk/L is about $55 \times 10^{-9}$. Even with a hydrogel material having a water content of 80% and with a Dk equal to 53, a lens would have to be produced at approximately 70 microns in order for Dk/L to be $75 \times 10^{-9}$.

As stated above, however, increasing the water content tends to lower the refractive index of the contact lens material and therefore require an increase in lens thickness. Even if this were not the case, however, thinner contact lenses have lower strength, less desirable handling properties and at high water content tend to dehydrate to such an extent that corneal staining occurs.

Examples of the current practice in the art of producing polymers for contact lenses is shown in European Patent Applications 0 330 614 and 0 330 615 both filed on Feb. 16, 1989. These publications describe contact lens polymers containing polyoxyalkylene and having the usual desirable properties of a soft contact lens, but both are described as containing in the hydrated state between 10% and 90% water, preferably between 35% and 55%, water by weight. European Patent Application number 0 263 061 filed on Aug. 24, 1987 also describes a contact lens material consisting of a polyoxyalkylene backbone unit and absorbing less than 10% water by weight. This polyoxyalkylene backbone forms a polymer which requires the addition of carbonyl containing monomers to induce surface wettability, but which also lowers oxygen permeability. EP patents 330614, 330615, and 330618 uses polyether and carbamate linkages to produce contact lens polymers of both low and high water content but also use small molecular weight monomers to increase the water content of the base polymer. These patents fail to teach the use of more biocompatible materials such as sugars which contain carbon atoms bonded to two oxygen atoms (geminal) as part of their structures. The materials of the references also require large amounts of hydrophilic modifiers to induce wettability and silicon materials require surface treatment of some type.

U.S. Pat. No. 3,225,012 discloses a polymer that is prepared by polymerizing 1,2: 5,6-di-0-isopropylidene- 3-O-methacryloyl-D-glucose and then removing the isopropylidene groups from the glucose by acid hydrolysis. U.S. Pat. No. 3,356,652 describes a polymer that is derived from 2-(D-glucose)oxyethyl methacrylate. Both U.S. Pat. Nos. 3,225,012 and 3,356,652 use the glucose component of the polymer as a terminated pendant group off of a repeating carbon backbone, and not as the primary repeating group from which the polymer chain is formed.

It is an object of the invention to devise a contact lens construction and material where dehydration of the lens, and therefore the eye, is of little concern and furthermore does not allow proteins or other tear components to penetrate and deposit in the lens.

It is a further object of the invention, that a material and construction of a contact lens would have sufficient refractivity and a modulus of elasticity such that the lens could be processed thin enough to present a high degree of wearer comfort.

More specifically, it is the object of the invention to provide a contact lens material and construction wherein the permeability, Dk, of the material in combination with its thickness, L, would provide a gas transmissibility through the lens, equal to Dk/L, exceeding that attainable with current hydrogel soft contact lenses.

It is a further object of the invention to devise a polymer capable of inducing surface wettability without the addition of oxygen-permeability inhibiting carbonyl monomers.

The above objects of the invention are attained while maintaining the comfort level of current soft contact lenses by maintaining pliability and wettability of the lenses thus minimizing mechanical agitation of the cornea.

SUMMARY OF THE INVENTION

The present invention achieves the above objects by recognizing that the performance and comfort characteristics achieved by current hydrated soft contact lenses need not necessarily be accomplished by the use of highly hydrated materials with a high water content. In particular, wearing comfort and a high refractive index can be obtained in a low water lens that also possesses the characteristics of good gas permeability, particularly for $O_2$.

A low water contact lens material having high $O_2$ permeability is one in which dehydration of the lens is of little concern. A lower water content and reduced polymer matrix size does not allow protein or other tear components to penetrate and deposit in the lens. In addition, a lens with a reduced polymer matrix size has a greater index of refraction and has a greater modulus of elasticity. With such a material, the lens can be made thin enough so that the combination of the material permeability, Dk, and thickness, L, of the lens would achieve the desired criterion for Dk/L. Furthermore, such material, which would be as soft and pliable as current hydrated contact lens materials and have good surface wettability, would maintain the comfort of soft contact lenses, in contrast to the corneal agitation caused by low water contact lenses of the hard type.

More specifically, particular materials and methods are described to meet the above criteria. In contrast to prior polyoxyalkylene contact lens materials, the present materials have the advantage of having free hydroxyl groups capable of inducing surface wettability without adding carbonyl monomers which lower oxygen permeability.

In the preferred embodiment of the invention, such a lens is made by polymerizing and crosslinking a prepolymer which contains a cyclic polyol with polyalkylether segments containing curable segments. The cyclic polyols consist of alkoxylated glucose or sucrose which are then reacted with an isocyanate to produce an ultraviolet curable prepolymer. The prepolymer is then placed in a mold and polymerized by exposure to ultraviolet light. The lens can then be placed into a solution such that the free hydroxyl groups of the material react with a highly hydrophilic reagent to form covalent bonds thus making the surface of the material more wettable.

DESCRIPTION OF THE DRAWINGS

FIG. 1 is a graph showing the relationship (theoretical and measured) between oxygen permeability and water content for a hydrogel.

FIG. 2 is a graph showing the relationship among lens thickness, Dk of a material and material transmissibility (dk/L).

FIG. 3 is a graph showing the relationship between water content and oxygen permeability for three materials with hydrophilic modifier added to increase water content.

DESCRIPTION OF THE PREFERRED EMBODIMENT

A contact lens is made of a polymer with the properties described above by first producing the prepolymer as follows. An ultraviolet light curable isocyanate such as isocyanoethylmethacrylate (IEM), available from Polysciences, is reacted with a polyalkylether such as polypropylene glycol, polyethylene glycol, polypropylene glycol having amine terminals, or polyethylene glycol with amine terminals. These polyalkylether materials are available from: Aldrich Chemical Co, Inc., 101 West Saint Paul Avenue, Milwaukee, Wis. 53233; Dow Chemical USA, 611 Cascade West Parkway S.E., Midland, Mich. 49506; Fluka Chemika-BioChemika, 980 South Second Street, Ronkonoma, N.Y. 11779; and Polysciences Inc., 400 Valley Road, Warrington, Pa. 18976 in varying molecular weights from 200 to 1,000,000. Amine terminated polyethylene and polypropylene copolymers are commercially available under the tradename Jeffamines from Texaco Chemical Co., 4800 Forunace Place, Bellaire, Tex. 74401. Another uv reactive isocyanate that maybe used is m- isopropenyl-2,2-dimethylbenzyl-isocyanate from American Cyanamid Co., One Cyanamid Plaza, Wayne, N.J. 07470. From the above reaction with IEM an intermediate polymer is produced:

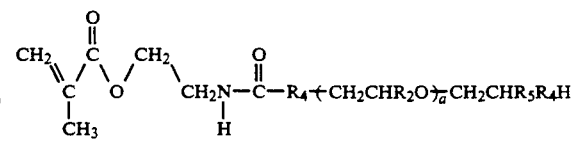

where:
$R_2$ = either of the group consisting of $CH_3$ and H,
$R_4$ = either of the group consisting of O and NH, and $a \leq 75$ for $R_2 = CH_3$, $a \leq 225$ for $R_2 = H$ As an alternative to starting with IEM, hydroxyethylmethacrylate (HEMA)

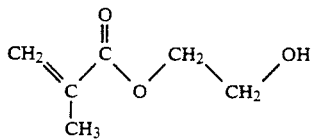

may be reacted with toluene diisocyanate (TDI)

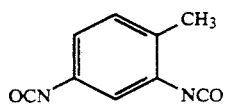

to produce:

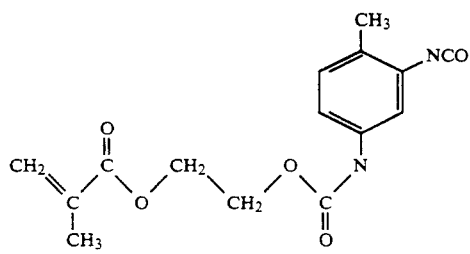

or HEMA may be reacted with isophorone diisocyanate

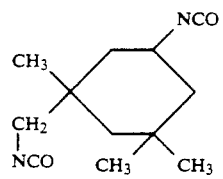

to produce:

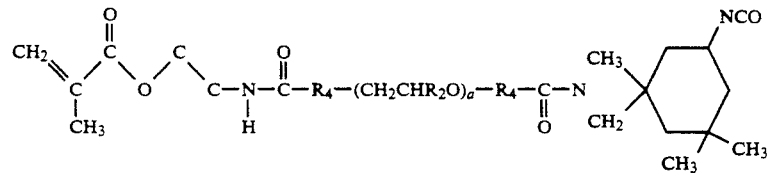

The product of either of the two above reactions may be reacted with the polypropylene glycol or polyethylene glycol diol to yield a product as that given in the first, direct reaction described above, but with a different uv reactive terminal group at one end.

In the above alternate synthesis routes using toluene-diisocyanate or isophoronediisocyanate, the amount of di-uv functional compound is kept to a minimum because the TDI and isophoronediisocyanate contain two isocyanate functional groups with two different reactivities, favoring the reaction of one group.

The above reactions are conducted in methylene chloride as a reaction solvent in the presence of a catalyst such as stannous octoate. Other appropriate urethane catalysts include triethyl amines e.g., trimethylamine, triethylamine, N,N-dimethylbenzylamine or an organo metallic urethane catalyst, such as stannous octoate, dibutyltin dilaurate or sodium acetate.

The IEM is slowly added to the glycol over a three to four hour period. In this way the formation of the di-caped species is held to a minimum. The polypropylene or polyethylene glycol is in slight molar excess to the IEM to further minimize the formation of di-capped species.

The product of the above reaction, however produced, is then reacted again with either TDI or isophoronediisocyanate to give a uv curable isocyanate. For example, TDI is reacted in equal molar concentration with the PPG or PEG polymer in the presence of methylene chloride and stannous octoate over a five to eight hour period. TDI represents a benzo-di-isocyanate, several of which are acceptable.

Diisocyanates that may be used include p-tetramethyl- xylene-diisocyanate, trimethyl-hexane-1, 6-diisocyanate, hexane-1,6-diisocyanate, phenylene-1,4-diisocyanate, toluene-2,6-diisocyanate, cyclohexane-1,4-diisocyanate, and most preferably toluene-2,4-diisocyanate and isophorone diisocyanate.

For example, the reaction product using TDI is the high molecular weight, uv curable isocyanate:

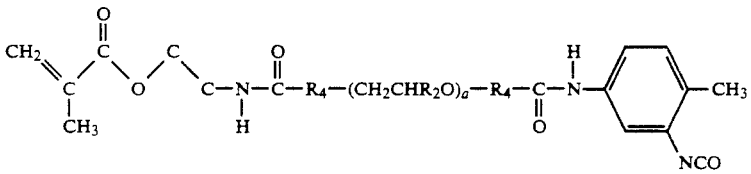

The uv curable isocyanate produced in the immediately preceding reaction is then reacted with sucrose or glucose alkoxylated with ethylene or propylene oxide. The alkoxylation is to a degree that the polyol becomes soluble in an organic solvent suitable for isocyanate reactions with hydroxyl or amino functionalities. Aprotic solvents which are appropriate for the synthesis of the above uv-curable prepolymers include methylene chloride, chloroform, tert-butyl acetate, isopropyl acetate, N,N-dimethylformamide, phosphoric acid tri-dimethylamide, acetonitrile, acetamide, N,N-dimethylformamide, and dimethyl sulfoxide.

Alkoxylated glucose and sucrose can be purchased from a number of sources typically with the total molecular weight of the polyethylene or polypropylene equal to 10 or 20 per molecule of glucose or sucrose. Cyclic polyol materials included in the above are commercially available from Amerchol Corporation, 136

Talmadge Road, Edison, N.J. 08819, and are sold under the tradename Glucam E-10, E-20, P-10, and P-20 with the "E" denoting an ethylene oxide adduct and the number representing the number of moles of ethylene oxide added. The "P" denotes a propylene oxide adduct with ten and twenty moles of propylene oxide added respectively. Custom amounts of alkoxylation may be used, however, within the range from about a total of 5 to 50 polymer units per molecule of glucose or sucrose.

Shown as a chemical formula:

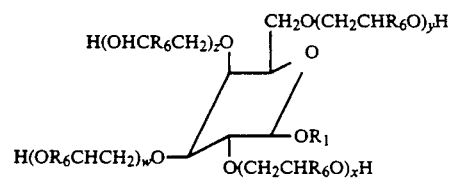

and

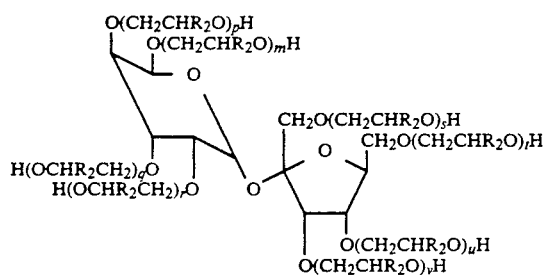

where:
$R_1$ is one of the group consisting of N-aliphatic and branched aliphatic chains having between 1 and 7 carbon atoms,
$R_2$ = either of the group consisting of $CH_2$ and H,
$R_4$ = either of the group consisting of O and NH,

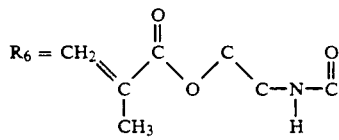

$a \leq 75$ for $R_2 = CH_3$, $a \leq 225$ for $R_2 = H$ $5 \leq w + x + y + z \leq 50$ $5 \leq m + p + q + r + s + t + u + v + \leq 50$ Most cyclic polyols are soluble and reactive with isocyanates only in organic solvents which are extremely difficult to remove. When the above alkoxylated glucose and sucrose have relatively small amounts of alkoxylation, however, these alkoxylated polyols are soluble in solvents like: acetonitile, methylene chloride, chloroform and carbontetrachloride. These solvents are acceptable for the reaction of an isocyanate with the above specified akoxylated cyclic polyols and can be removed without great difficulty.

The prepolymer is then formed by reacting the alkoxylated glucose or sucrose with the above uv curable isocyanate in methylene chloride. The alkoxylated glucose has 4 sites and sucrose has 8 sites available for reaction with the high molecular weight, uv curable isocyanate. At least one site must be reacted in using either the alkoxylated glucose or sucrose, but the remaining sites may either be reacted with the high molecular wight, uv-curable isocyanate or left as hydroxyl groups, depending on the desire for a high modulus (more reacted sites) or greater surface wettability (fewer reacted sites).

The number of reacted sites, on average, is determined by the relative stoichiometry of the alkoxylated cyclic polyol and the uv curable isocyanate. In the preferred embodiment, the ratio of uv curable isocyanate to alkoxylated cyclic polyol is about 3 to 1 for glucose and 5 to 1 for sucrose to yield the desired characteristics of wettability and modulus.

The methyl chloride is removed yielding a viscous prepolymer having one of the chemical structure as follows depending on the cyclic polyol used:

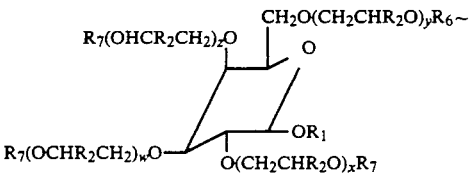

or

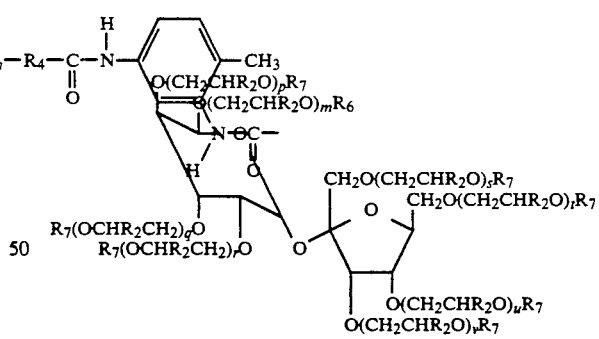

where:
$R_7$ = either of the group consisting of H and $R_6$.

The prepolymers are polymerized with actinic radiation in the presence of a free radical initiator and a diluent non-reactive with the prepolymer. Acceptable inert diluents are alkanols, N,N-dimethylformamide acetamide, acetonitrile, N,N-dimethylacetamide, heptane, dimethyl sulfoxide, acetone, tert-butyl acetate, ethyl acetate, isopropyl acetate, and N-methyl-2-pyrrolidone with a low molecular weight polyproplene glycol preferred. Acceptable initiators are: an azo compound, e.g., 2,2-azo-bisisobutyronitrile, 2,2'-azo- bis-(2,4-dimethylvaleronitrile), 1,1'-azo-bis-(cyclohexane carbonitrile), 2,2'-azo-bis-(2,4-dimethyl-4-methoxyvaleronitrile) and phenyl-azo-isobutyronitrile; a photoinitiaor, e.g. benzoin methyl ether and 1-hydroxycyclohexyl phenyl kentone; ionizing rays e.g., gamma rays or/x-rays; or a peroxide e.g., di-tert-butyl peroxide, benzoly peroxide, lauryl peroxide, decanoyl peroxide, acetyl peroxide, succinic acid peroxide, methyl ethyl ketone peroxide, 2,4-dichlorobenzoyl peroxide, isopropyl peroctoate, tert-butyl hydroperoxide, diisopropyl peroxydicarbonate, tert-butyl perpivalate, tert-butyl peroctoate, cumene hydroperoxide, tert-butyl perbenzoate, tert-butyl peroxymaleic acid, tert-butyl peroxyacetate, and potassium persulfate. Initiation with ultraviolet light of 220–230mn wavelength until fully cured is preferred.

The prepolymers are transferred to a mold and polymerized into a ophthalmic lens or may be spun-cast into contact lenses, with molding preferred as described in U.S. Pat. No. 4,889,664 or 4,495,313.

The final product is a lens comprised of one or both of the polymers as follows:

After the disappearance of the hydroxyl peak the reaction was assumed to be completed.

Step 2

To the above reaction was added 5.43g Amerchol Glucam E-10 and after the NCO adsorption at 2270 cm$^{-1}$ had been removed by reacting with the hydroxyl groups of Glucam, the reaction was assumed to be complete and was then stripped of the methylene chloride, resulting in a pourable mixture. To this mixture was added 0.20–0.40% Darocur 1173 and cured at 1.7 millijoules for approximately 20 minutes.

For example 16

To a 1 liter flask was placed 85g (0.0213 mole) of polypropylene glycol 4000 and 15g of (0.0150 mole) polyethylene glycol 1000 with 2 parts methylene chloride and 0.05% stannous octonate relative to the glycols. To this was added 5.46g (0.0352 mole) isocyanoethyl methacrylate over a 4–5 hour period. The reaction was monitored by the disappearance of the NCO absorption at 2270 cm$^{-1}$.

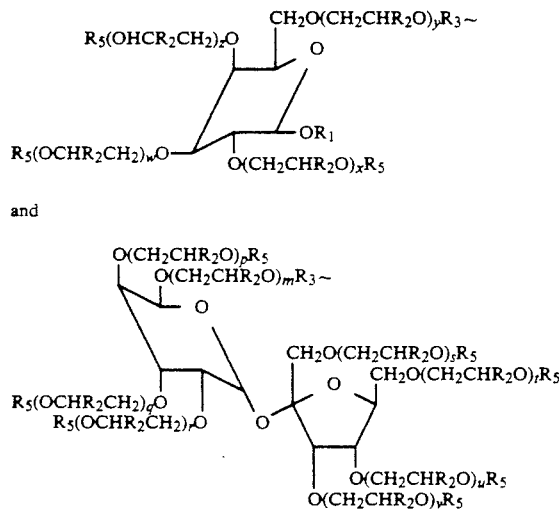

and

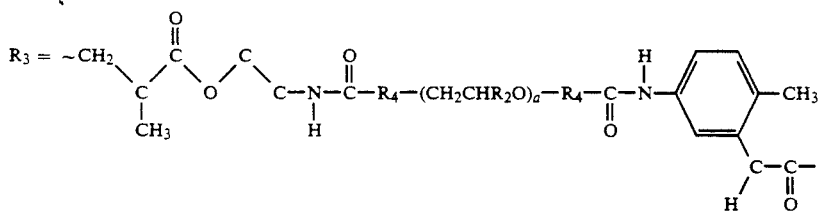

where:

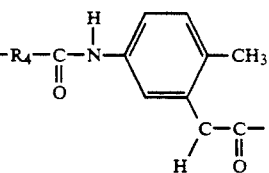

and $R_5$ = either of the group consisting of H and $R_3$.

Detailed procedures for some of the above examples given in the Table are as follows.

For Example 1–4

Step 1

To a liter flask was placed 100g (0.025 mole) of Polypropylene glycol 4000 with 1 part of methylene chloride and 0.05% Stannous Octonate relative to the Polypropylene glycol 4000. To this was added 1.94g (0.0125 mole) of isocyanoethyl methacrylate over a 4–5 hour period. The reaction was monitored by the disappearance of the NCO absorption at 2270 cm$^{-1}$. The above mixture was then added to a dropping funnel and added to 4.3g (0.025 mole) of toluyenediisocyanate (TDI).

After the above reaction was complete, the product was added to a dropping funnel and added to 6.13g (0.0213 mole) toluyenediisocyanate (TDI). After reduction of the NCO peak at 2270 cm$^{-1}$ and the disappearance of the hydroxyl peak at approximately 3500 cm$^{-1}$ the reaction was assumed completed. To the above reaction was added 12.63g (0.0121 mole) of Glucamate E-20 which was added from a dropping funnel with 3 parts methylene chloride slowly over a 1 hour period. The reaction was again monitored by the disappearance of the NCO peak at 2270 cm$^{-1}$. When the reaction was complete the methylene chloride was removed under reduced pressure to give a viscous prepolymer ready for thermal or UV cure. Optionally an initiator may be added to the mixture before the removal of the methylene chloride.

The same above synthetic steps can be carried out to produce all of the prepolymers in the examples.

If polymerization is performed in the presence of a diluent as described above, the crosslinked polymer can be equilibrated in an aqueous saline solution after polymerization at which time the crosslinked polymer swells relative to the amount of water uptake associated with the particular polymer. At this stage the polymers are dimensionally stable and can be sterilized.

The higher modulus of the material of the present invention permits a thinner lens to be made that retains the handling characteristics of thicker current contact lenses. In addition, because of the higher polymer matrix density, even with the higher water content lens made according to the present invention, the polymer matrix of the material showed no detectable protein deposition compared to a typical high water content lens absorbing 688 micrograms of protein in artificial tears in 24 hours.

The composition and properties of polymers made using PPG and PEG of various molecular weights are given in the Table. Examples 13 through 16 of the Table show the composition of polymers produced with PPG/PEG mixtures which have an increased water content compared to the polymers containing only PPG.

Although low water content lenses are preferred for the above reasons to reduce dehydration when placed on the eye, these higher water content lenses can be made with favorable characteristics. With the proper choice of hydrophilic reagents, a material can be constructed that has an increased water content of hydration and still maintains excellent physical properties (see Table). These materials have optical properties that allow the lens to be made at a reduced thickness, approximately 50 microns, and a water content of 60%, but still maintain good stiffness.

In the most preferred embodiment, low water content material according to the invention have superior strength and dehydration resistance resulting from the low water content and achieve Dk/L requirements because of gas permeability and thickness.

Because of the higher refractive index, a thinner portion of material is needed to achieve a corrective power and would result in a lens that is approximately 35 microns thick. The improved oxygen permeability, Dk, in combination with this reduction in thickness, L, (possible because of the higher refractive index) combines to give a superior Dk/L compared to the prior art high water content soft contact lenses.

As shown in FIG. 3, the water content of the lens of the present invention can be increased without decreasing the oxygen permeability, Dk, of the material by adding polyethylene glycol (PEG) during formation of the intermediate polymer. This is in contrast to the prior art practice of adding low molecular weight hydrophilic modifiers such as HEMA and DMA which decreased Dk substantially as water content increased.

TABLE

| | Example Number | | | | | | | | | |
|---|---|---|---|---|---|---|---|---|---|---|
| | 1 | 2 | 3 | 4 | 5 | 6 | 7 | 8 | 9 | 10 |
| Polyol | E-10 | E-20 | P-10 | P-20 | E-10 | E-20 | P-20 | P-20 | E-10 | E-20 |
| Grams Polyol | 5.3 | 8.9 | 6.40 | 11.1 | 10.7 | 17.93 | 13.1 | 22.7 | 21.48 | 36.01 |
| Moles Polyol | 0.0085 | 0.0085 | 0.0085 | 0.0085 | 0.0172 | 0.0172 | 0.0172 | 0.0172 | 0.0385 | 0.0345 |
| Polyether (I) | PPG4000 | PPG4000 | PPG4000 | PPG4000 | PPG2000 | PPG2000 | PPG2000 | PPG2000 | PPG1000 | PPG1000 |
| Grams Polyether (I) | 100 | 100 | 100 | 100 | 100 | 100 | 100 | 100 | 100 | 100 |
| Moles Polyether (I) | 0.025 | 0.025 | 0.025 | 0.025 | 0.05 | 0.05 | 0.05 | 0.05 | 0.100 | 0.100 |
| Polyether (II) | — | — | — | — | — | — | — | — | — | — |
| Grams Polyether (II) | — | — | — | — | — | — | — | — | — | — |
| Moles Polyether (II) | — | — | — | — | — | — | — | — | — | — |
| Diisocyanate | TDI | TDI | TDI | TDI | TDI | TDI | TDI | TDI | TDI | TDI |
| Grams Diisocyante | 4.35 | 4.35 | 4.35 | 4.35 | 8.71 | 8.71 | 8.71 | 8.71 | 4.35 | 4.35 |
| Moles Diisocyanate | .025 | .025 | .025 | .025 | 0.050 | 0.050 | 0.050 | 0.050 | .025 | .025 |
| UV-Curable Isocyanate | IEM | IEM | IEM | IEM | IEM | IEM | IEM | IEM | IEM | IEM |
| Moles Curable Isocyan | 0.0245 | 0.0245 | 0.0245 | 0.0245 | 0.050 | 0.050 | 0.050 | 0.050 | 0.0245 | 0.0245 |
| Grams Curable Isocyan | 3.8 | 3.8 | 3.8 | 3.8 | 7.6 | 7.6 | 7.6 | 7.6 | 3.8 | 3.8 |
| DK ($10^{-11}$) | 54 | 59 | 55 | 66 | 34 | 35 | 32 | 24 | 11 | 14 |
| % Water | 4 | 7 | 1 | 3 | 5 | 12 | 3 | 3 | 8 | 17 |
| Tensile (psi) | 332 | 287 | 201 | 257 | 604 | 610 | 400 | 408 | 409 | 405 |
| Modulus (psi) | 111 | 95 | 83 | 98 | 43 | 39 | 194 | 178 | 384 | 332 |
| Elongation (%) | 336 | 308 | 262 | 285 | 234 | 257 | 181 | 197 | 91 | 113 |

| | Example Number | | | | | | |
|---|---|---|---|---|---|---|---|
| | 11 | 12 | 13 | 14 | 15 | 16 | 17 |
| Polyol | P-10 | P-20 | E-10 | E-20 | E-20 | E-20 | |
| Grams Polyol | 26.3 | 45.54 | 36.01 | 21.29 | 22.41 | 26.85 | 50 |
| Moles Polyol | 0.0345 | 0.0345 | 0.0345 | 0.0198 | 0.0208 | 0.025 | 0.0188 |
| Polyether (I) | PPG1000 | PEG1000 | PPG1000 | PPG4000 | PPG4000 | PPG4000 | PPG4000 |
| Grams Polyether (I) | 100 | 100 | 100 | 190 | 186 | 170 | |
| Moles Polyether (I) | 0.100 | 0.100 | 0.05 | 0.0475 | 0.0465 | 0.0425 | .0704 |
| Polyether (II) | — | — | — | PEG1000 | PEG1000 | PEG1000 | PEG1000 |
| Grams Polyether (II) | — | — | — | 10.00 | 14.00 | 30.0 | 23.5 |
| Moles Polyether (II) | — | — | — | 0.0575 | 0.0605 | 0.725 | .0235 |
| Diisocyanate | TDI | TDI | TDI | TDI | TDI | TDI | TDI |
| Grams Diisocyante | 4.35 | 4.35 | 8.71 | 10.01 | 10.54 | 12.63 | 16.36 |
| Moles Diisocyanate | .025 | .025 | 0.050 | 0.0575 | 0.0605 | 0.0725 | .0939 |
| UV-Curable Isocyanate | IEM | IEM | IEM | IEM | IEM | IEM | IEM |
| Moles Curable Isocyan | 0.0245 | 0.0245 | 0.050 | 0.05635 | 0.0592 | 0.07105 | .0939 |
| Grams Curable Isocyan | 3.8 | 3.8 | 7.6 | 8.74 | 9.2 | 11.02 | 14.0 |
| DK ($10^{-11}$) | 12 | 14 | 28 | 68 | 64 | 62 | 60 |
| % Water | 4 | 4 | 58 | 8 | 12 | 25 | 26 |
| Tensile (psi) | 313 | 404 | 355 | 207 | 285 | 264 | |
| Modulus (psi) | 310 | 282 | 110 | 90 | 82 | 85 | 84 |

| | | | | | | | |
|---|---|---|---|---|---|---|---|
| Elongation (%) | 98 | 127 | 181 | 239 | 319 | 285 | 346 |

I claim:

1. A soft ophthalmic lens adapted for placement over the cornea or in the eye made from a polymer having repeating units of:

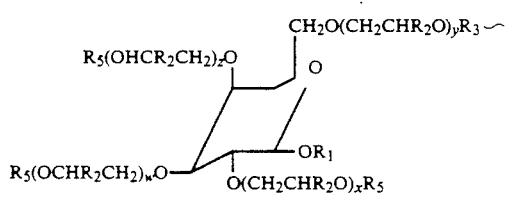

where:

$R_1$ is one of the group consisting of N-aliphatic and branched aliphatic chains having between 1 and 7 carbon atoms, $R_2$ = either of the group consisting of $CH_3$ and H,

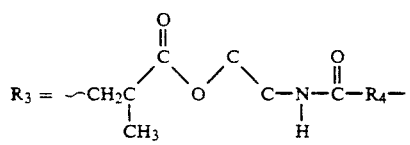

$R_4$ = either of the group consisting of O and NH,
$R_5$ = either of the group consisting of H and $R_3$, $a \leq 75$ for $R_2 = CH_3$, $a \leq 225$ for $R_2 = H$ and $5 \leq w+x+y+z \leq 50$ 2. A soft ophthalmic lens adapted for placement over the cornea or in the eye made from a polymer having repeating units of:

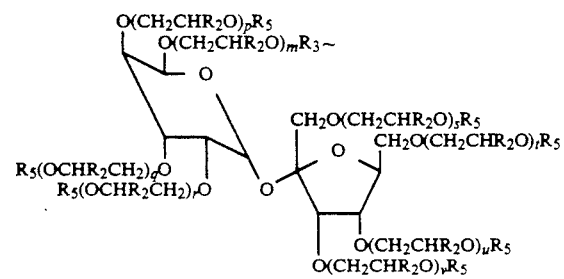

where:

$R_2$ = either of the group consisting of $CH_3$ and H,

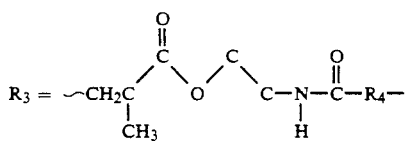

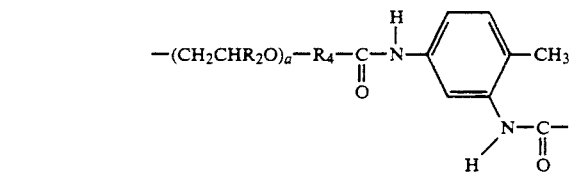

$R_4$ = either of the group consisting of O and NH,
$R_5$ = either of the group consisting of H and $R_3$, $a \leq 75$ $R_2 = CH_3$, $a \leq 225$ for $R_2 = H$ and $5 \leq m+p+q+r+s+t+u+v+2 \leq 50$ 3. A method of making the prepolymer:

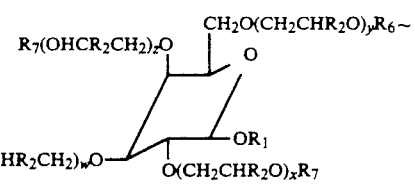

where:

$R_1$ is one of the group consisting of N-aliphatic and branched aliphatic chains having between 1 and 7 carbon atoms, $R_2$ = either of the group consisting of $CH_3$ and H,
$R_4$ = either of the group consisting of O and NH,

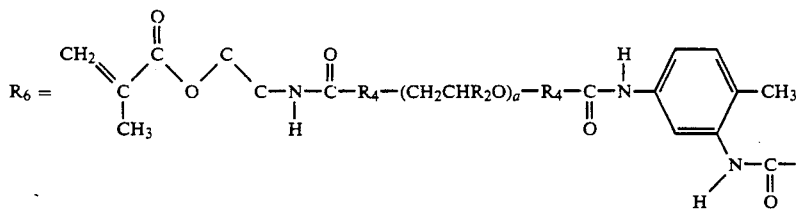

$R_7$ = either of the group consisting of H and $R_6$, $a \leq 75$ for $R_2 = CH_3$, $a \leq 225$ for $R_2 = H$ and $5 \leq w + x + y + z \leq 50$ comprising the steps of:
reacting the high molecular weight, uv curable isocyanate:

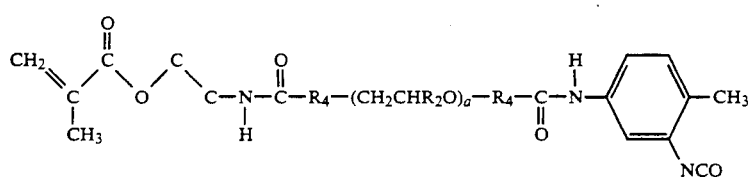

with the alkoxylated glucose:

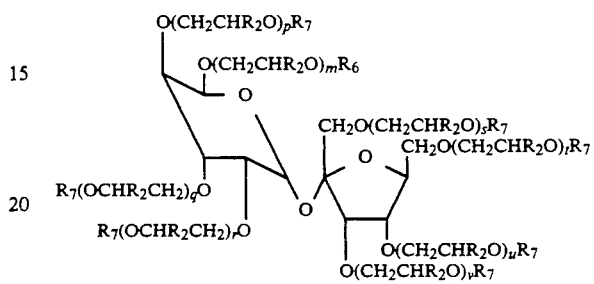

in the ration from about 1 to 4 molecules of said isocyanate to 1 molecule of said alkoxylated glucose.

4. A method of making the prepolymer:

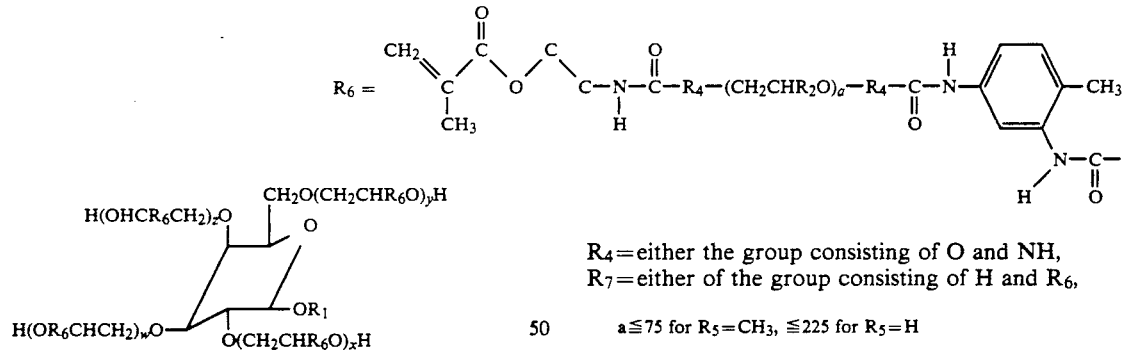

where:
$R_2$ = either of the group consisting of $CH_3$ and H, $R_4$ = either the group consisting of O and NH,
$R_7$ = either of the group consisting of H and $R_6$, $a \leq 75$ for $R_5 = CH_3$, $\leq 225$ for $R_5 = H$ and $5 \leq m + p + q + r + s + t + u + v \leq 50$ comprising the step of:
reacting the high molecular weight, uv curable isocyanate:

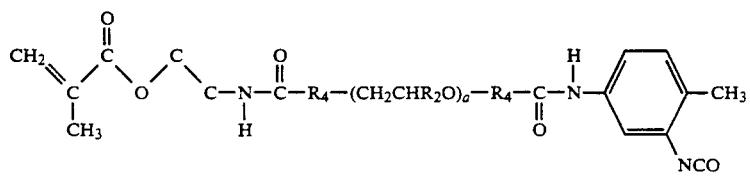

with the alkoxylated sucrose:

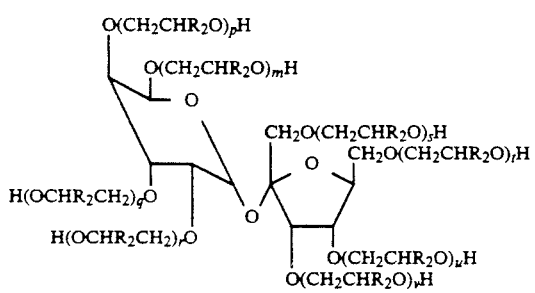

in the ratio of from about 1 to 8 molecules of said isocyanate to 1 molecule of said alkoxylated sucrose.

5. The method of claim 3 or 4 wherein said high molecular weight, uv curable isocyanate is formed by reacting the intermediate polymer:

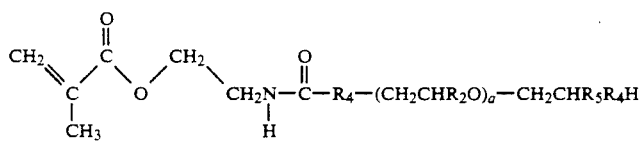

with a benzo-di isocyanate.

6. The method of claim 5 wherein said intermediate polymer is formed by reacting isocyanoethyl methacrylate:

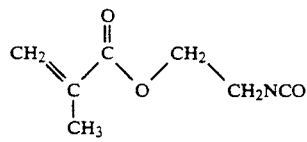

with either of (propoxylated or polypropylene) glycol and the corresponding amine terminated polyglycol:

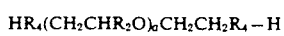

7. The method of claim 3 or 4 wherein said high molecular weight, uv curable isocyanate si formed by reacting hydroxymethylmethacrylate:

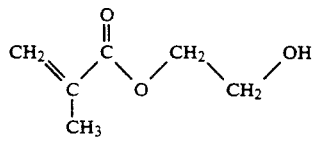

with toluenediisocyanate:

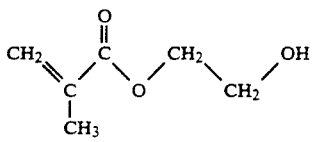

to form:

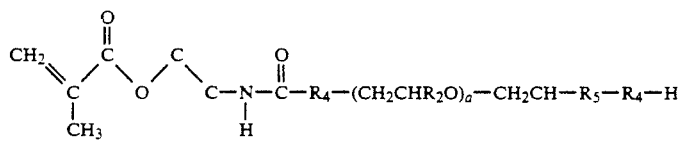

which is then reacted with the intermediate polymer:

8. The method of claim 3 or 4 wherein said high molecular weight, uv curable isocyanate si formed by reacting hydroxymethylmethacrylate:

with isophorone diisocyanate:

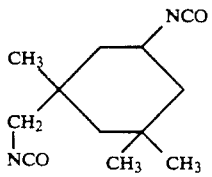

to form:

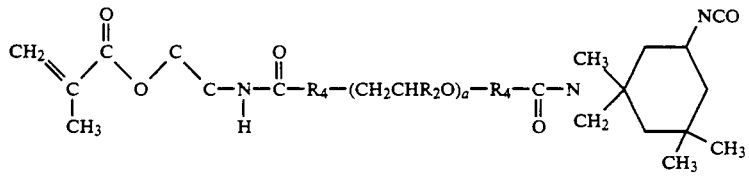

which is then reacted with the intermediate polymer:

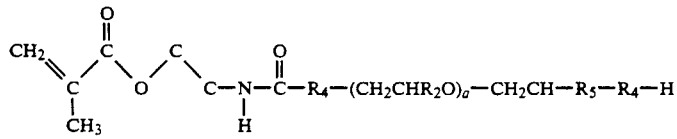

9. The method of claim 3 or claim 4 wherein said method is for making a soft ophthalmic lens for placement on the cornea or in the eye, further comprising the additional steps of:
mixing said prepolymer with a diluent,
placing said prepolymer/diluent mixture into a lens mold, at least one surface of said mold containing a non-zero optical power,
polymerizing said prepolymer into a contact lens by impinging said mixture with energy sufficient to cause polymerization,
removing the polymerized lens from said mold, and
hydrating the lens by displacing the diluent with water.

10. The prepolymer:

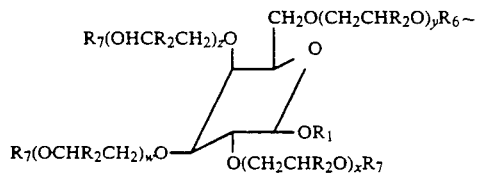

where:
$R_1$ is one of the group consisting of N-aliphatic and branched aliphatic chains having between 1 and 7 carbon atoms.
$R_2$ = either of the group consisting of $CH_3$ and H,

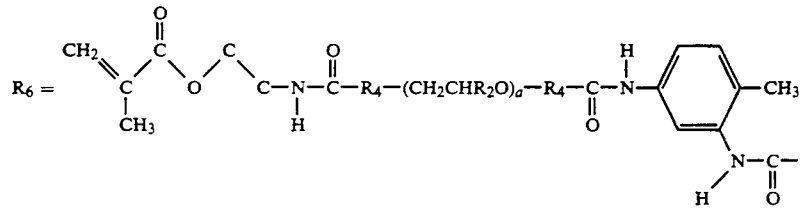

$R_4$ = either the group consisting of O and NH,
$R_7$ = either of the group consisting of H and $R_6$, $a \leq 75$ for $R_2=CH_3$, $\leq 225$ for $R_2=H$ and $5 \leq w+x+y+z+ \leq 50$ 11. The prepolymer:

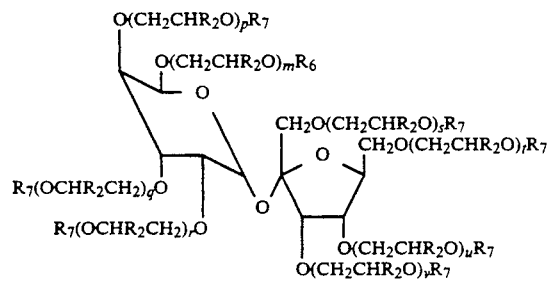

where:
$R_2$ = either of the group consisting of $CH_3$ and H,

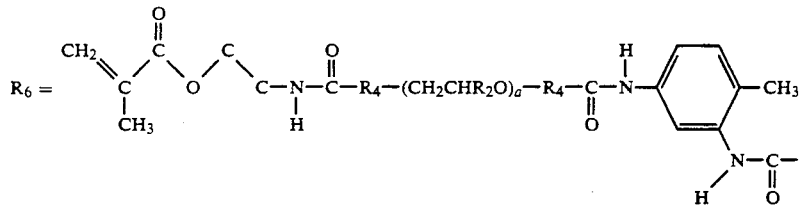

$R_4$ = either the group consisting of O and NH,
$R_7$ = either of the group consisting of H and $R_6$, $a \leq 75$ for $R_5=CH_3$, $\leq 225$ for $R_5=H$ and $5 \leq m+p+q+r+s+t+u+v \leq 50$

* * * * *

UNITED STATES PATENT AND TRADEMARK OFFICE
CERTIFICATE OF CORRECTION

PATENT NO. : 5,196,458
DATED : March 23, 1993
INVENTOR(S) : Ivan M. Nunez; James D. Ford; Frank Molock It is certified that error appears in the above-indentified patent and that said Letters Patent is hereby corrected as shown below:

Column 13:
In Claim 1, the formula should appear as follows [the valence line from the $CH_2O(CH_2CHR_2O)_yR_3-$) group to the ring is attached to the ring in the wrong place]:

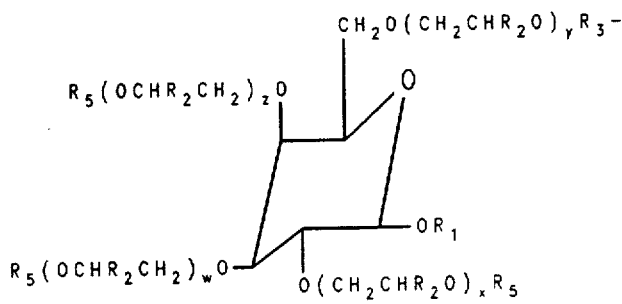

Column 14, line 51, after "... +u+v", delete the "2".

Column 15, line 53, delete "ration" and insert therefor --- ratio ---.

UNITED STATES PATENT AND TRADEMARK OFFICE
CERTIFICATE OF CORRECTION

PATENT NO. : 5,196,458

DATED : March 23, 1993

INVENTOR(S) : Ivan M. Nunez; James D. Ford; Frank Molock

It is certified that error appears in the above-indentified patent and that said Letters Patent is hereby corrected as shown below:

Column 17, line 59, and Column 18, line 49, delete "si" at both occurrences and insert therefor --is--

Signed and Sealed this

Twenty-ninth Day of March, 1994

Attest:

BRUCE LEHMAN

Attesting Officer

Commissioner of Patents and Trademarks